March 7, 1933.  H. M. GASSTROM  1,900,640
YIELDING JOINT FOR EXTENSION RULES
Filed April 3, 1929
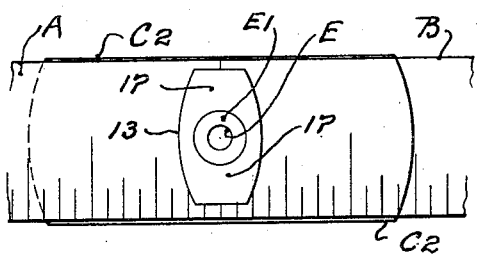
Fig. I.
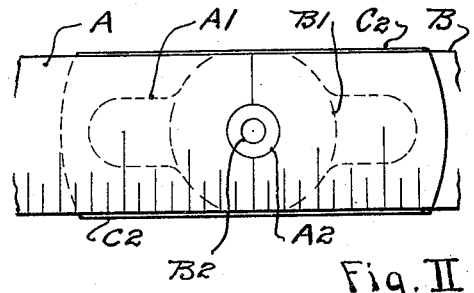
Fig. II.
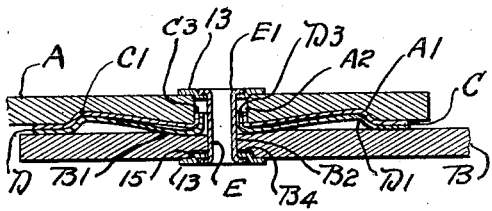
Fig. III.
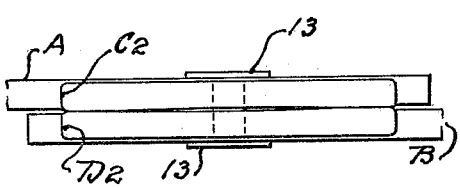
Fig. IV.
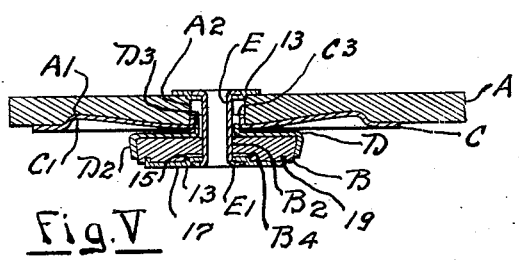
Fig. V.
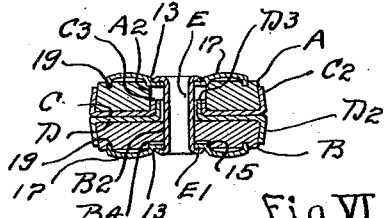
Fig. VI.
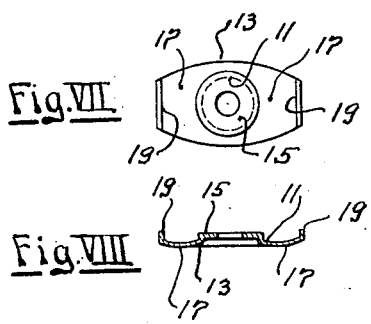
Fig. VII.
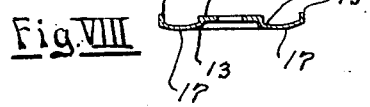
Fig. VIII.
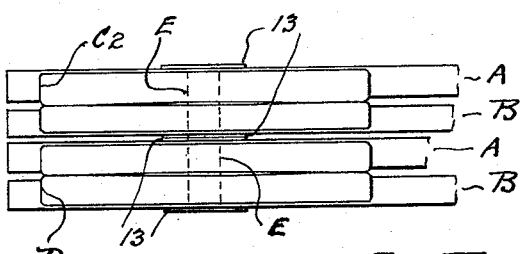
Fig. IX.
Inventor
Herman M. Gasstrom
By his Attorney
H C Karlson Patented Mar. 7, 1933

1,900,640

UNITED STATES PATENT OFFICE

HERMAN M. GASSTROM, OF MOUNT VERNON, NEW YORK

YIELDING JOINT FOR EXTENSION RULES

Application filed April 3, 1929. Serial No. 352,130.

This invention relates to joints for foldable measuring rules, and it appertains particularly to such yieldable connections wherein the flexure takes place in the direction of their pivots.

One object of the invention is to provide a joint of the class described, eliminating the stresses imposed directly on the members composing the rule, while the interrelative positions thereof are being changed.

Another object is to produce a joint of the character referred to, having resilient elements coacting with the pivotal connection intermediate the hinged members of the rule to maintain the necessary tension therebetween.

A further object is the provision in a joint of the nature set forth, of means for applying the required pressure upon the overlapping ends of the rule members in close adjacency to their edges instead of at the middle thereof.

Still another object is the production of a joint of the type mentioned, in which the pressure elements for the ends of the wooden strips composing the rule members, tend to hold them from splitting.

A still further object consists in providing a joint of the kind specified wherein frictional engagement only occurs intermediately the metal contacting surfaces of the pressure exerting elements and the pivotal connections for the rule members, thus avoiding rubbing action between the latter and the aforesaid connections.

An important object is to supply a joint of the species alluded to, having pressure applying elements disposed at the outer faces of each pair of rule members and so arranged as to protect the graduations and figures on adjacent members from wear.

A general object is to furnish a joint for the purpose in view which shall be of simple, strong and compact construction; capable of being embodied with existing types of rules; that will increase the durability of the connections between the rule members; and amenable besides, to low cost of manufacture and assembling.

Other objects and advantages of the invention will become apparent as the specification proceeds.

With the aforesaid objects in view, the invention consists of the novel combinations and arrangements of parts hereinafter described in their preferred embodiments, pointed out in the subjoined claims and illustrated on the annexed drawing, wherein like parts are designated by the same reference characters throughout the several views.

Generally described, the invention under consideration includes in combination with the overlapping ends of adjacent members of a folding or extension rule having interengaging joint plates, and the pintle which passes thru both thereof. The headed over terminals of this pintle are received within centrally depressed portions of resilient, yoke-like elements that are made to overlie the opposed outer faces of the rule members in a direction widthwise thereto. The extremities of the aforesaid elements are provided with bent over anchorages adapted to take over and, if desired enter into the material whereof the members are composed. Such anchorages not only prevent displacement of the elements relatively to the members referred to, but serve also to hold the latter, when made of wood, from splitting. At such times as the rule members are shifted one with respect to the other, i. e. swung from open to closed position or vice versa, when the interlocking cam-portions on their joint plates are moved out of registry, the members of the rule are also spread apart. The stresses thus produced are taken up or resisted by the slightly arched yoke-elements, the yielding actions whereof permit these members to pass over one another without any appreciable strain being imposed thereon. The before mentioned elements as well, perform the function of retaining the rule members aligned, whether open or closed. The outer faces of the yoke elements project beyond those of the members of the rule, and in contacting with similar elements on adjacent oppositely disposed members, when the rule is folded, protect their graduations and figures from coming together.

The advantages of the invention as here outlined are best realized when all of its features and instrumentalities are combined in the one and the same structure, but, useful devices may be produced embodying less than the whole.

It will be obvious to those skilled in the art to which the invention appertains, upon becoming conversant with the details thereof, that the same may be incorporated in several different constructions. The accompanying drawing, therefore, is submitted merely as showing the preferred exemplification of the invention.

In the annexed drawing which illustrates the invention in about twice natural size—

Figure I is a fragmentary top plan view of a pair of overlapping rule members, showing a yieldable retaining element in position thereon;

Fig. II is a view similar to the preceding, but omitting the element referred to;

Fig. III is a horizontal section taken longitudinally thru the centre of Fig. I, looking upwardly thereon from the lower edge of the last named figure;

Fig. IV is a fragmentary elevation of the rule members, corresponding to Fig. I, looking in an upward direction from the bottom side thereof;

Fig. V is a view similar to Fig. III, but showing the lower rule member displaced at 90° to the upper one;

Fig. VI is a horizontal section taken transversely thru the middle of Fig. I;

Fig. VII is an underside plan view of the element depicted in Fig. I;

Fig. VIII is a central longitudinal section of the same element; and

Fig. IX is a fragmentary side view, showing adjacent pairs of associated rule members held in spaced apart relation to one another.

Referring now to these several views for a detailed description of the invention thereby exemplified in its preferred embodiment, it will be observed that the known parts to which the same is applied have been designated by letters of reference, instead of numerals as are used for denoting the present improvement. This was done it will be understood merely to intimate that the said parts are not treated or considered as pertaining exclusively to the latter, but are claimed herein only in so far as they form therewith legitimate combinations of elements capable of yielding novel and useful results.

Pursuant to the method of notation adopted, the letter "A" designates one of a pair of superposed or overlapping, adjacent and graduation-bearing sections or members of an extension or folding measuring rule, and B the other or underlying member thereof.

In conformity with common practice, the inner or apposed faces of the aforesaid sections are provided with interlocking joint plates C, D, having sets of inter-engaging cam surfaces C1, D1, respectively, adapted as is customary to fit into one another, for maintaining the rule sections aligned, whether in extended or folded condition.

In order to accommodate one set of the before mentioned cam-portions, C1, the member A with which the same coacts, is routed as indicated at A1, the companion member B, being only routed centrally thereof, as shown at B1, Fig. II, so as to afford the proper seating for the bottom face of plate D. The means for securing both of these plates to their seats at the ends of the rule members have not been specifically illustrated, as the well known method of driving ears or tongues struck from the bases of the joint plates into the material of which these sections are composed, can be employed. Oppositely disposed flanges C2, D2, formed with the longitudinal sides of the plates C, D, respectively, are, as usually is the case, bent so as to clasp around the bevelled, sidewise narrowed edges of the rule sections A, B, near the end portions thereof, for the purpose of tieing the aforenamed parts into a firm assemblage.

From the middle of the said plates and preferably integral therewith, extend up ferrules C3, D3, in the same direction and proportioned to have a working fit, one within the other, to give an adequate bearing intermediately of the plates in question and the thereto attached members of the rule.

At A2, is represented that one of these rule sections is provided with a thru bore wherein is received the outer and larger bearing ferrule C3. It will be understood, as the rule members are being moved, that is, swung from one position to the other, and the cam surfaces C1, D1, incidentally forced apart, a rotative as well as an axial displacement will take place between the ferrules C3, D3.

The companion rule member B is furnished with a bore B2, disposed in axial alignment with the bearing ferrules and designed together with the latter to receive therethru a pintle E which for the sake of convenience may consist of a hollow rivet. Thus it will be seen that this pintle or tubular hinge pin stands in concentric relation to the said ferrules. The opposite terminals of pintle E are headed or rivetted over as denoted at E1, the heads or flanges thus formed being lodged within shallow pockets, encompassed by hollow, perforate bosses 11, offset from the rear faces of elements or flexible plates 13, one for each extremity of said hinge pintle. The undersides 15 of the pairs of bosses 11 are received one in bore A2 pertaining to member A, and the other within a recess B4 incorporated with the rule member B around the outer end of its pintle opening B2, by counterboring the same. By preference and as shown, the last mentioned recess is made of a depth slightly in excess of the height of the boss-portion of the thereto appertaining element 13 so that the underside 15 of the said boss cannot bottom in the recess B4.

The aforenamed elements or flexible plates 13 are substantially alike and of oblong or elongate formation, being preferably stamped of some springy or semi-resilient sheet metal to provide flexibility. From Figs. I and VI, it will be observed that the elements or plates 13 in question are disposed cross-wise of the rule members, e. g. transversely relatively to the joint plates thereof. It will also be noticed with respect to the sectioned views of the drawing hereto annexed, that the size of the bore A2 in one member is approximately the same as the recess B4 in the other member of the rule. From what has just above been stated, it will be comprehended, that exteriorly, the bosses 11 are of a diameter equal to the larger ferrule C3. The advantages of the foregoing details of construction are that the number of tools and operations necessary to perform on the different parts of the rule, are reduced to a minimum.

The intermediate portions 17 of the yoke-elements 13, namely those situated between the outer ends of the latter and the central bosses 11 thereof, are bowed upwardly or arched to some extent, in order to increase their flexibility. At such times as the rule members are spread apart one away from the other, by virtue of a swinging motion having been imparted to them by a person extending or folding the rule, the aforesaid portions 17 become momentarily flattened to a certain degree, due to the outward force exerted thereon by the members A, B. But immediately the cams C1, D1, thereof have snapped into engagement, the springiness of the said portions of the elements 13 serve to draw and resiliently clamp the rule sections or members firmly but releasably together. The opposite free extremities of the yieldable arm portions 17 are bent right angularly thereto on the same side of the elements as their bosses 11, said bent over lips being indicated at 19. The protuberances thus formed are pressed into the hard wood strips of which the rule members are ordinarily made. These lips anchor the yoke-elements in their assigned positions on the rule members and prevent the latter from splitting, especially where they have been reduced or weakened by the bores and recesses intersecting the same. When metal strips are employed instead of wooden ones, it is obvious that rule members of this kind would have to be indented or provided with appropriate cavities to receive the before named lips. The pressure exerted by the clamp elements onto the members of the rule is to greatest extent applied by the outer ends of the former.

Not only do the yoke or clamping elements act to relieve the rule members themselves of the combined bending and twisting stresses usually imposed thereon, but these elements also function, by reason of the fact that they project slightly beyond the outer faces of the members, to guard against the graduations and numbers imprinted on them from coming into rubbing contact, thus prolonging the useful life of a measuring instrument constructed according to the present invention, to many times that of the prevailing types of folding rules, and without increasing the manufacturing cost, or sacrificing the strength and other advantages embodied in this improved article.

Notwithstanding a pair of clamping elements have been shown and described, as co-acting with the opposite outer faces of adjacent rule members, it is conceivable that under certain conditions, only one of these elements needs to be used, as the flexure required to draw the members together after having been spread apart, can be borne by a single element.

While a certain preferred embodiment of this joint has been shown and described, it will be understood that changes in the form, arrangements, proportions, sizes and details thereof may be made, without departing from the scope of the invention as defined by the appended claims.

Having described my invention what I desire to secure by Letters Patent and claim, is—

1. In a folding rule, the combination with the members and the joint plates thereof, of a hinge pintle passing thru said members and plates, and an element having pivotal engagement with an end of said pintle and projecting beyond the outer face of one of the members, said element being bowed crosswise of the rule members and adapted to flex when the same are swung from one position to another, the flexing of the element avoiding stresses in the said members.

2. In a folding rule, the combination with the members and the joint plates therebetween, of a pivot passing thru said members and plates, and elements widthwise superlying the outer faces of the members and anchored against displacement relatively thereto, the extremities of said elements yieldably engaging the said members, the elements being hingedly engaged by said pivot.

3. In a folding rule, the combination with the members and the joint plates for locking the same, of a pivot passing thru said plates and the thereto attached members, elongate elements yieldingly superposed upon the exterior faces of said members crosswise thereof, said elements being anchored to said faces and having depressed central recesses therein, the ends of said pivot being headed and operatively received within said recesses, there being a hinged engagement between the latter and the pivot heads, thereby enabling one rule member to be swung relatively to the other.

4. In a folding rule, the combination with the members and the joint plates for retaining the same in either extended or folded condition, of a pintle passing thru said members and plates, elements reaching across the exterior faces of the members and provided with hollow bosses recessed therein, the interior of said bosses being adapted to receive headed extremities on said pintle, the latter having pivotal connections with said bosses, and means for fixedly anchoring the outer portions of said elements adjacent the edges of the said members.

5. In a folding rule, the combination with the members and the joint plates therebetween, interfitting bearing ferrules formed with said plates, one of said members being bored to accommodate the ferrules, of a pintle passing thru the members and said ferrules, yoke-like spring-elements projecting transversely above the members' exterior faces and provided with depressed hollow bosses one whereof is received in said bore, and heads at the ends of said pintle lodged within the hollow of said bosses, said heads affording the pintle rotative movement relative to said elements while serving to tension the yoke portions of the latter.

6. In a folding rule, the combination with the members and the joint plates thereof, of a pintle passing therethru, elements overlying the exterior faces of said members transversely, and means anchoring the extremities of said elements in proximity to the edges of the members, the ends of said pintle having pivotal connections with central portions of the elements, the latter projecting above the members and contacting with one another when the said members are in folded condition.

HERMAN M. GASSTROM.